United States Patent
Kim et al.

(10) Patent No.: US 12,230,816 B2
(45) Date of Patent: Feb. 18, 2025

(54) SECONDARY BATTERY CASE, AND SECONDARY BATTERY

(71) Applicant: LG Chem, Ltd., Seoul (KR)

(72) Inventors: Hyun Beom Kim, Daejeon (KR); Jun Kyu Park, Daejeon (KR); Jeong Min Ha, Daejeon (KR); Gi Man Kim, Daejeon (KR); Hyun Chul Ha, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1049 days.

(21) Appl. No.: 16/973,159

(22) PCT Filed: Feb. 27, 2020

(86) PCT No.: PCT/KR2020/002813
§ 371 (c)(1),
(2) Date: Dec. 8, 2020

(87) PCT Pub. No.: WO2020/180052
PCT Pub. Date: Sep. 10, 2020

(65) Prior Publication Data
US 2021/0257695 A1  Aug. 19, 2021

(30) Foreign Application Priority Data
Mar. 4, 2019 (KR) .......... 10-2019-0024845

(51) Int. Cl.
*H01M 50/186* (2021.01)
*H01M 50/136* (2021.01)
(Continued)

(52) U.S. Cl.
CPC ....... *H01M 50/186* (2021.01); *H01M 50/136* (2021.01); *H01M 50/238* (2021.01); *H01M 50/105* (2021.01)

(58) Field of Classification Search
CPC ............. H01M 50/186; H01M 50/136; H01M 50/238; H01M 50/105; H01M 50/193;
(Continued)

(56) References Cited

U.S. PATENT DOCUMENTS

2009/0311592 A1  12/2009  You et al.
2013/0004835 A1   1/2013  Roy
(Continued)

FOREIGN PATENT DOCUMENTS

| CN | 102848646 A | 1/2013 |
| CN | 107851741 A | 3/2018 |

(Continued)

OTHER PUBLICATIONS

International Search Report for Application No. PCT/KR2020/002813, dated Jun. 19, 2020, 4 pages.
(Continued)

*Primary Examiner* — Cynthia K Walls
(74) *Attorney, Agent, or Firm* — Lerner David LLP

(57) ABSTRACT

A secondary battery case includes a recess part recessed downward, and a sealing part provided around the recess part when the secondary battery case is unfolded. At least portions of the sealing part are attached to each other to seal inner surfaces of the recess part from an outside. A secondary battery includes an electrode assembly and the secondary battery case. The recess part of the secondary battery case has a width that corresponds to a thickness of the electrode assembly.

19 Claims, 12 Drawing Sheets

(51) Int. Cl.
H01M 50/15 (2021.01)
H01M 50/238 (2021.01)
H01M 50/105 (2021.01)

(58) Field of Classification Search
CPC . H01M 10/0585; H01M 50/178; Y02P 70/50;
Y02E 60/01
See application file for complete search history.

(56) References Cited

U.S. PATENT DOCUMENTS

| | | |
|---|---|---|
| 2013/0011721 A1 | 1/2013 | Kim et al. |
| 2014/0196839 A1 | 7/2014 | Roy |
| 2018/0175346 A1 | 6/2018 | Schmid-Schoenbein |
| 2018/0219245 A1 | 8/2018 | Choi et al. |
| 2019/0027714 A1 | 1/2019 | Jung et al. |
| 2019/0312237 A1 | 10/2019 | Moon et al. |
| 2020/0365836 A1 | 11/2020 | Jung et al. |
| 2021/0066676 A1 | 3/2021 | Jung et al. |
| 2021/0257695 A1 | 8/2021 | Kim et al. |
| 2022/0115687 A1 | 4/2022 | Choi et al. |

FOREIGN PATENT DOCUMENTS

| | | | |
|---|---|---|---|
| CN | 108431986 | A | 8/2018 |
| DE | 102016225184 | A1 | 6/2018 |
| JP | S60246554 | A | 12/1985 |
| JP | 2004071301 | A | 3/2004 |
| JP | 2009533834 | A | 9/2009 |
| JP | 2013546136 | A | 12/2013 |
| JP | 2018527719 | A | 9/2018 |
| JP | 2019500734 | A | 1/2019 |
| JP | 2021518978 | A | 8/2021 |
| KR | 20070102768 | A | 10/2007 |
| KR | 100895202 | B1 | 5/2009 |
| KR | 20170022156 | A | 3/2017 |
| KR | 20170052061 | A | 5/2017 |
| KR | 20170069981 | A | 6/2017 |
| KR | 20180029856 | A | 3/2018 |
| KR | 20180085185 | A | 7/2018 |
| KR | 20180123901 | A | 11/2018 |
| KR | 20190010434 | A | 1/2019 |
| WO | 2017078437 | A1 | 5/2017 |
| WO | 2018186637 | A2 | 10/2018 |

OTHER PUBLICATIONS

Extended European Search Report including Written Opinion for Application No. 20766102.6 dated Aug. 17, 2021, pp. 1-8.
Search Report dated Jul. 18, 2022 from the Office Action for Chinese Application No. 202080002302.6 issued Jul. 26, 2022, pp. 1-2.
Search Report dated Apr. 24, 2023 from the Office Action for Chinese Application No. 202080002302.6 issued Apr. 27, 2023, 9 pages. (see p. 8, categorizing the cited references).

SECONDARY BATTERY CASE, AND SECONDARY BATTERY

CROSS-REFERENCE TO RELATED APPLICATIONS

The present application is a national phase entry under 35 U.S.C. § 371 of International Application No. PCT/KR2020/002813, filed Feb. 27, 2020, published in Korean, which claims the benefit of the priority of Korean Patent Application No. 10-2019-0024845, filed on Mar. 4, 2019, which are hereby incorporated by reference in their entireties.

TECHNICAL FIELD

The present invention relates to a secondary battery case and a secondary battery, and particularly, to: a secondary battery case having a structure capable of reducing a volume occupied by a secondary battery when compared to the related art; and the secondary battery.

BACKGROUND ART

Secondary batteries which are repeatedly chargeable and dischargeable may be classified into a cylindrical secondary battery, a prismatic secondary battery, a pouch-type secondary battery or the like, depending on structures and manufacturing methods thereof. Among these secondary batteries, the secondary pouch-type battery generally accommodates an electrode assembly having a structure in which electrodes and separators are alternately arranged within a sheet-shape pouch exterior.

According to the related art, in order to manufacture the pouch-type secondary battery, after a forming process in which a portion of a sheet-shape pouch, corresponding to a surface area of the electrode assembly, is pressed to form a recessed cup, the electrode assembly is mounted in the cup provided in the pouch. Subsequently, portions of a sealing part of the pouch are attached to each other to form a sealed portion of the battery case.

The sealed portion of the battery case is formed by attaching the portions of the sealing part of the pouch, that is, formed by attaching areas which are not pressed in the forming process. Thus, due to a stepped portion between the sealing part not subjected to the forming process and the cup subjected to the forming process, a portion of the sealing part is beyond a width of the cup. FIG. 1 illustrates a state in which a portion of a sealing part 3 provided in each of upper and lower portions of a pouch 2 of a pouch-type secondary battery 1 manufactured according to the related art protrudes by P beyond a width of a cup in which an electrode assembly is accommodated.

The protruding portion causes an increase in dead space not contributing to a capacity of the secondary battery, and as a result, energy density of the secondary battery is degraded.

DISCLOSURE OF THE INVENTION

Technical Problem

Thus, an object achieved by the present invention is to eliminate a dead space, defined in a sealing part of a pouch-type secondary battery manufactured according to the related art, and increase energy density of the secondary battery.

Technical Solution

According to one aspect of the present invention in order to achieve the object described above, provided is a secondary battery case configured to accommodate an electrode assembly having a structure in which electrodes and separators are alternately arranged, the secondary battery case including: s part recessed downward; and a sealing part provided around the recess part when the secondary battery case is unfolded, wherein at least portions of the sealing part are attached to each other to seal inner surfaces of the recess part from an outside.

The secondary battery case may further include an inclined part adjacent to the recess part and has a surface that is inclined downward toward the outside in a direction away from the recess part when the secondary battery case is unfolded, wherein, when the secondary battery case is unfolded, the sealing part surrounds circumferences of the recess part and the inclined part.

The inclined part may include: a first inclined portion provided on one side of the recess part when the secondary battery case is unfolded; and a second inclined portion provided on another side of the recess part when the secondary battery case is unfolded.

When the secondary battery case is unfolded, a sum of a height of a stepped portion between the first inclined portion and the sealing part and a height of a stepped portion between the second inclined portion and the sealing part may correspond to a width of the recess part.

A bending line, which is a line along which the sealing part is bent, may be disposed on the sealing part, and the bending line may include: a first bending line extending outward from a point at which the first inclined portion, the recess part, and the sealing part meet each other; a second bending line extending outward from a point at which the second inclined portion, the recess part, and the sealing part meet each other, the second bending line meeting the first bending line; and a third bending line extending outward from a point at which the first bending line and the second bending line meet each other.

The bending line may further include a fourth bending line that extends along the first inclined portion and the second inclined portion from a point at which the first bending line, the second bending line, and the third bending line meet each other.

An area of the sealing part defined outside the fourth bending line may be attached to another area of the sealing part.

When the secondary battery case is unfolded, a sealing recess portion, which is recessed in a direction in which the recess part is recessed, may be provided on the sealing part, the sealing recess portion may be provided in parallel to the recess part, and a width of the sealing recess portion may correspond to a width of the recess part.

The sealing recess portion may include a first recess surface and a second recess surface which are provided adjacent to the recess part, and the first recess surface and the second recess surface may meet each other to form a V-shape, wherein a bending line, which is a line along which the sealing part is bent, is provided on the sealing part, and the bending line includes: a first bending line provided on a boundary between the first recess surface and an area of the sealing part, which is adjacent to the first inclined portion; a second bending line provided on a boundary between the second recess surface and an area of the sealing part, which is adjacent to the second inclined portion; and a third bending line provided on a boundary between the first recess surface and the second recess surface.

The bending line may further include a fourth bending line that extends in both directions along the first inclined portion and the second inclined portion from one point of the third bending line.

An area of the sealing part defined outside the fourth bending line may be attached to another area of the sealing part.

The sealing recess portion may include a first recess surface and a second recess surface which are provided adjacent to the recess part, and the first recess surface and the second recess surface may meet each other to form a V-shape, wherein the first recess surface includes: a first inclined recess surface which is inclined downward from the recess part toward the second recess surface and is inclined upward toward an outside of the sealing part; and a second inclined recess surface which extends outward from the first inclined recess surface, wherein the second recess surface includes: a third inclined recess surface which is inclined downward from the recess part toward the first recess surface and is inclined upward toward the outside of the sealing part; and a fourth inclined recess surface which extends outward from the third inclined recess surface.

A bending line, which is a line along which the sealing part is bent, may be provided on the sealing part, and the bending line may include: a first bending line provided on a boundary between the first recess surface and an area of the sealing part adjacent to the first inclined portion; a second bending line provided on a boundary between the second recess surface and an area of the sealing part adjacent to the second inclined portion; and a third bending line provided on a boundary between the first recess surface and the second recess surface.

The bending line "may further include a fourth bending line "that extends along the first inclined portion and the second inclined portion from one point of the third bending line".

An area of the sealing part defined outside the fourth bending line may be attached to the other area of the sealing part.

The inclined part may be provided on one side of the recess part when the secondary battery case is unfolded, and the secondary battery case may further include a flat part which has a flat surface and is provided on another side of the recess part when the secondary battery case is unfolded.

The secondary battery case may further include a flat part which has a flat surface and is provided between the inclined part and the recess part when the secondary battery case is unfolded.

According to another aspect of the present invention in order to achieve the object described above, provided is a secondary battery including: an electrode assembly; and the secondary battery case.

Advantageous Effects

According to the present invention, since the dead space defined on the sealing part of the pouch-type secondary battery is eliminated, the energy density of the secondary battery may increase.

MODE FOR CARRYING OUT THE INVENTION

Figure 1:
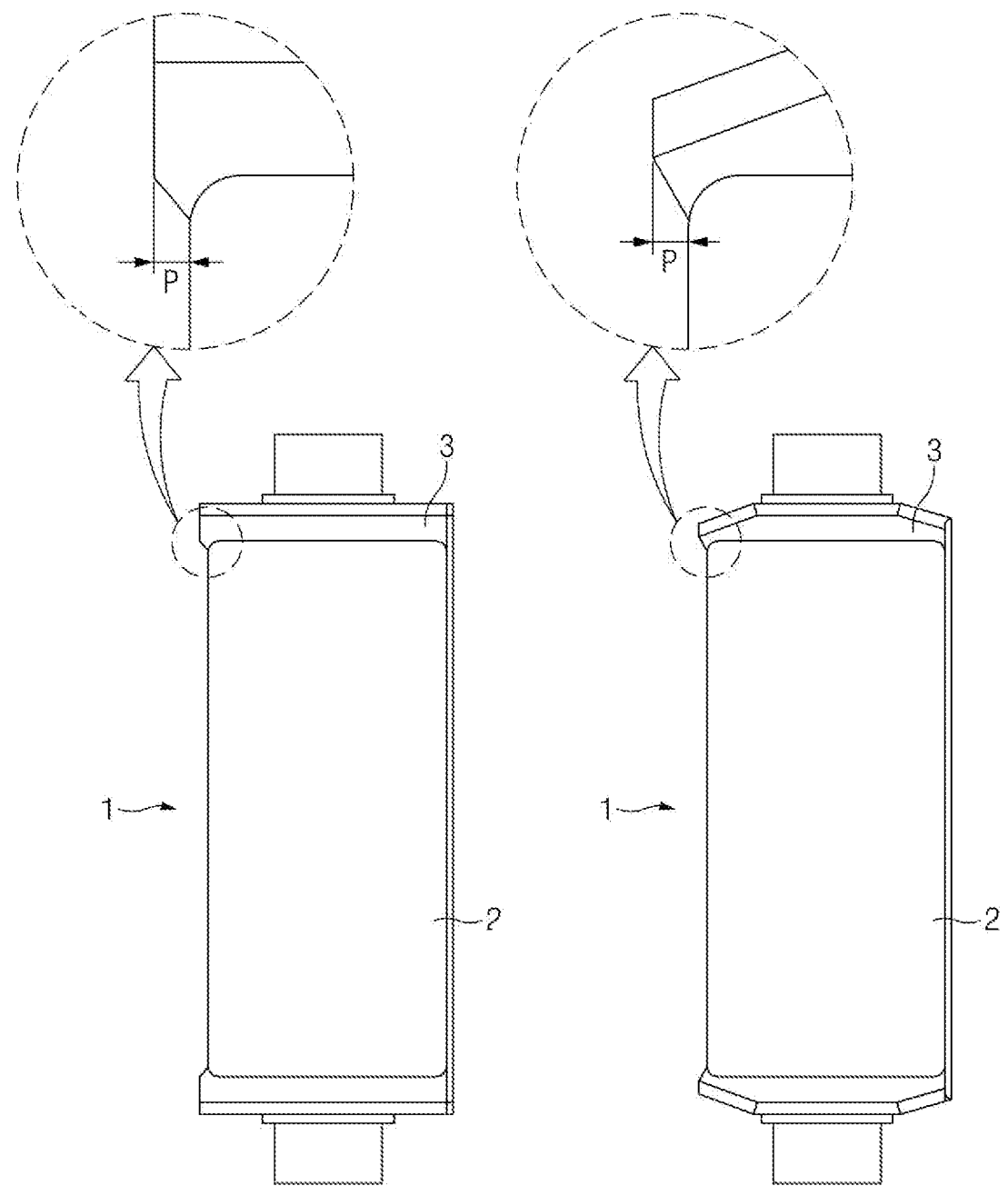
FIG. 1 is a view illustrating a structure of a secondary battery manufactured according to the related art.
Figure 2:
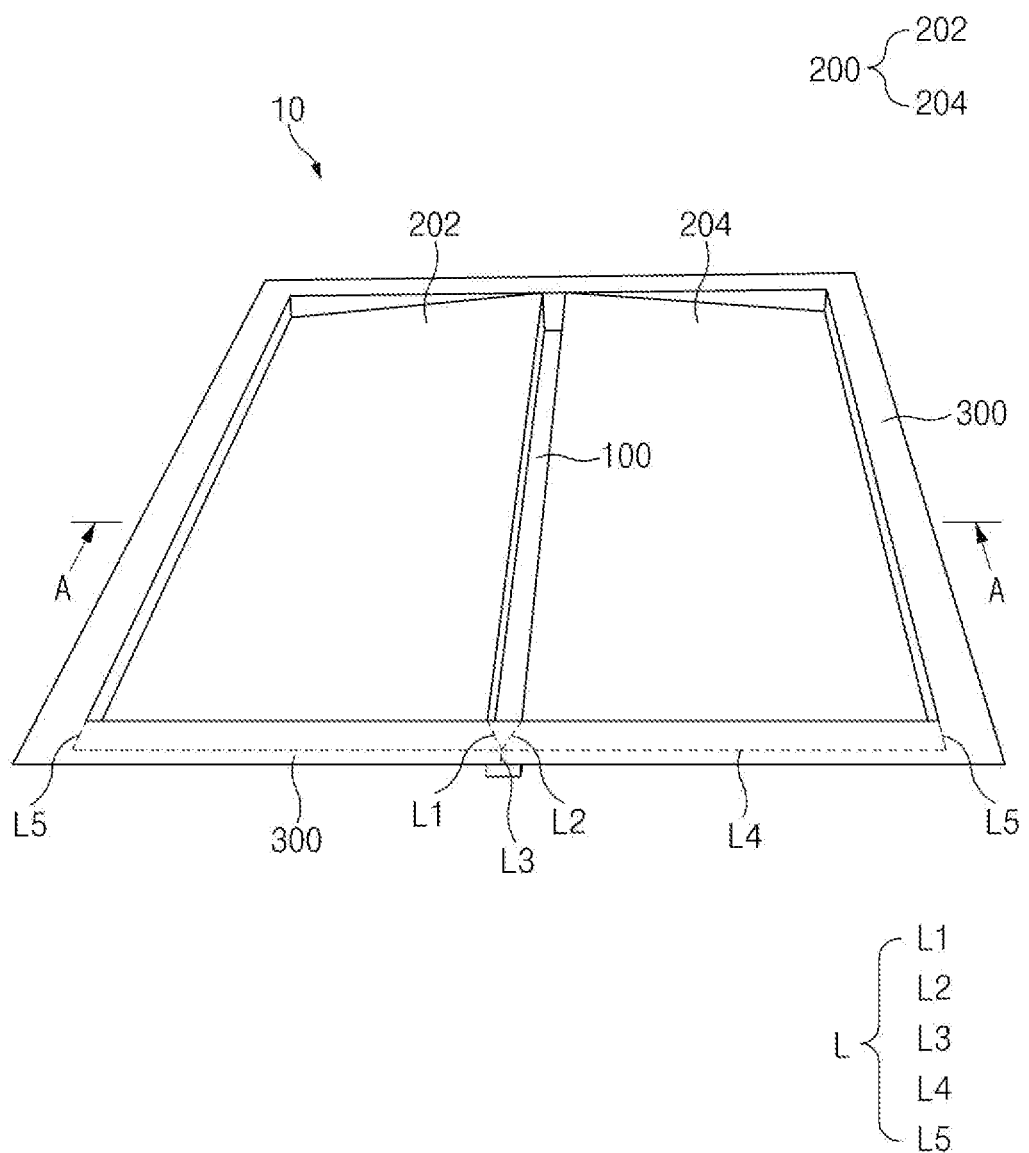
FIG. 2 is a perspective view illustrating a state in which a secondary battery case according to first embodiment of the present invention is unfolded.
Figure 3:
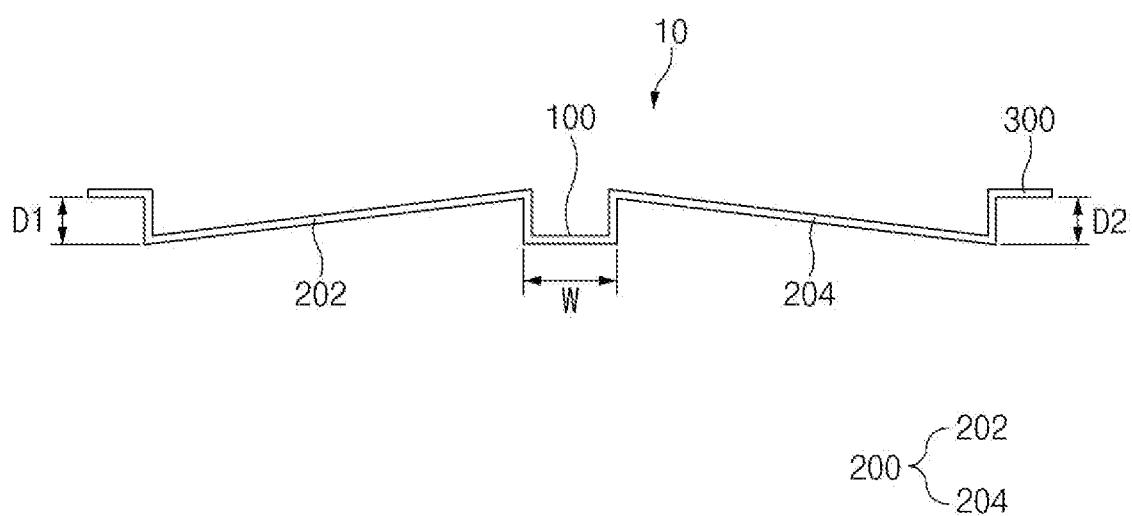
FIG. 3 is a cross-sectional view illustrating the secondary battery case, taken along line A-A of FIG. 2.

Hereinafter, structures of a secondary battery case and a secondary battery according to the present invention will be described with reference to the drawings.
Secondary Battery Case FIG. 2 is a perspective view illustrating a state in which a secondary battery case according to a first embodiment of the present invention is unfolded. FIG. 3 is a cross-sectional view illustrating the secondary battery case, taken along line A-A of FIG. 2.

A secondary battery case 10 (hereinafter, referred to as a case 10) according to the present invention may be a sheet-shape exterior, and a secondary battery according to the present invention may be a pouch-type secondary battery.

As illustrated in FIG. 2, the case 10 according to the first embodiment of the present invention may be configured to accommodate an electrode assembly (not shown) having a structure in which electrodes and separators are alternately arranged.

The case 10 according to the first embodiment of the present invention may include a recess part 100 having a predetermined width W and recessed downward. The predetermined width W of the recess part 100 may correspond to a thickness of an electrode assembly accommodated within the case 10. That 'the predetermined width of the recess part corresponds to the thickness of the electrode assembly accommodated within the case' may be interpreted as that not only the width of the recess part 100 and the thickness of the electrode assembly are equal to each other, but also the electrode assembly is insertable into the recess part 100 of the case 10 in a thickness direction.

Continuously referring to FIG. 2, the case 10 according to the present invention may include a sealing part 300. Portions of the sealing part 300 may be configured to be attached to each other and allow the electrode assembly within the case 10 of the secondary battery to be sealed from the outside. Also, it may be understood as that portions of the sealing part 300 are configured to be attached to each other and allow an inner surface of the recess part 100 to be sealed from the outside. When the case 10 is unfolded, the sealing part 300 may be provided around the recess part 100. As illustrated in FIG. 2, when the unfolded case 10 is viewed from above, the sealing part 300 may be provided to surround a circumference of the recess part 100. As illustrated in FIGS. 2 and 3, a vertical cross-section of the recess part 100 of the unfolded case 10 may have an angled U-shape. However, unlike the above, the vertical cross-section of the recess part 100 may have various shapes.

Also, as illustrated in FIGS. 2 and 3, when the case 10 is unfolded, an inclined part 200 having a surface inclined downward may be provided in the case 10 according to the present invention. As illustrated in FIGS. 2 and 3, the inclined part 200 may be provided adjacent to the recess part 100.

As illustrated in FIGS. 2 and 3, when the case 10 is unfolded, the inclined part 200 may be inclined downward toward the outside in an opposite direction to a region adjacent to the recess part 100. Also, the inclined part 200 may be provided on each of both sides of the recess part 100. That is, when the case 10 is unfolded, the inclined part 200 may include a first inclined portion 202 provided adjacent to one side of the recess part 100 and a second inclined portion 204 provided adjacent to the other side opposite to the one side of the recess part 100.

When the case 10 according to the present invention is unfolded under the circumference in which the recess part 100 and the inclined part 200 are provided in the case 10, the sealing part 300 may be provided to surround circumferences of the recess part 100 and the inclined part 200. That is, illustrated in FIG. 2, the sealing part 300 may be provided adjacent to a boundary of the inclined part 200 while provided adjacent to a boundary of the recess part 100. Also, since the inclined part 200 is inclined downward as described above, a stepped portion may be provided between the inclined part 200 and the sealing part 300.

Here, the case 10 according to the present invention may have a predetermined thickness when portions of the sealing part 300 are attached to each other. Here, the thickness of the case 10 may be equal to the width of the recess part 100. To this end, when the case 10 is unfolded under the circumference in which the inclined part 200 is provided on each of both sides of the recess part 10 as illustrated in FIG. 3, a sum of a height D1 of a stepped portion between the first inclined portion 202 and the sealing part 300 and a height D2 of a stepped portion between the second inclined portion 204 and the sealing part 300 may correspond to the width W of the recess part 100. For example, the sum of the D1 and D2 may be equal to W. Also, D1 and D2 may be equal to each other, and in this case, each of D1 and D2 may be 0.5 times the size of W.

Figure 4:
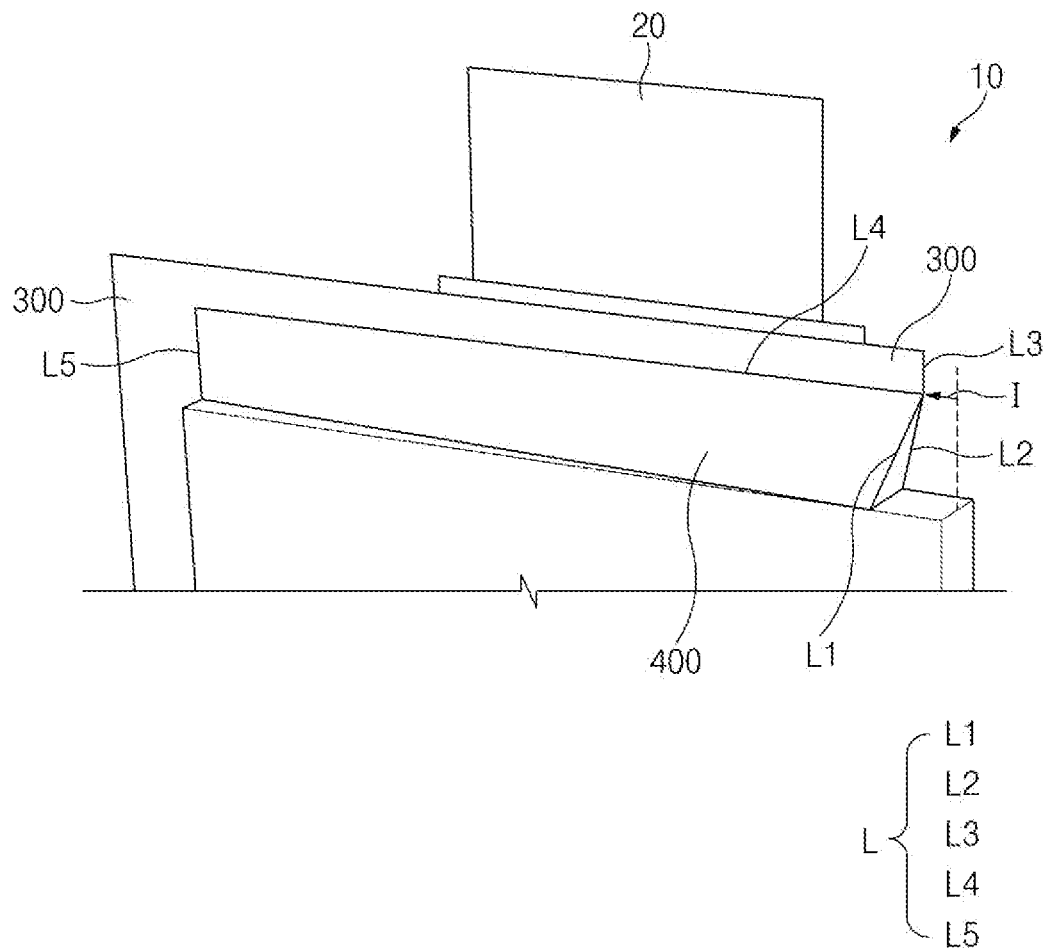
FIG. 4 is a perspective view illustrating a sealing part and a periphery of the sealing part when portions of the sealing part are attached to each other in the secondary battery case according to the first embodiment of the present invention.

FIG. 4 is a perspective view illustrating the sealing part and a periphery of the sealing part when portions of the sealing part are attached to each other in the secondary battery case according to the first embodiment of the present invention.

When portions of the sealing part 300 of the case 10 according to the first embodiment of the present invention as illustrated in FIGS. 2 and 4 are attached to each other, a portion of the sealing part 300 may be bent. A bending line L is a portion which is bent on the sealing part 300 when portions of the sealing part 300 of the case 10 according to the first embodiment of the present invention are attached to each other, and is shown as a dotted line.

The bending line L provided on the sealing part 300 of the case 10 according to the first embodiment of the present invention may include a first bending line L1 extending outward from a point at which the first inclined portion 202, the recess part 100, and the sealing part 300 meet each other, and a second bending line L2 extending outward from a point at which the second inclined portion 204, the recess part 100, and the sealing part 300 meet each other. Here, as illustrated in FIG. 2, the first bending line L1 and the second bending line L2 may meet each other. The first bending line L1 and the second bending line L2 may have the same length.

Continuously referring to FIG. 2, the bending line L of the case 10 according to the first embodiment of the present invention may further include a third bending line L3 extending outward from a point at which the first bending line L1 and the second bending line L2 meet each other. Also, the bending line L may further include a fourth bending line L4 that extends along the first inclined portion 202 or the second inclined portion 204 from a point at which the first bending line L1, the second bending line L2, and the third bending line L3 meet each other. FIG. 2 illustrates a state in which the fourth bending line L4 extends along each of the first inclined portion 202 and the second inclined portion 204.

Here, according to the first embodiment of the present invention, the bending line L may further include a fifth bending line L5 that extends from an end of the fourth bending line L4 toward the inclined part 200. FIG. 2 illustrates a state in which the fifth bending line L5 extends from the end of the fourth bending line L4 to a sharp edge on a boundary between the sealing part 300 and the inclined part 200.

According to the first embodiment of the present invention, when portions of the sealing part 300 are attached to each other, the bending line L provided on the sealing part of the case 10 is bent. FIG. 4 illustrates the sealing part and a periphery of the sealing part when portions of the sealing part 300 of the case 10 are attached to each other according to the first embodiment of the present invention.

When portions of the sealing part 300 of the case 10 according to the first embodiment of the present invention are attached to each other as illustrated in FIG. 4, the sealing part 300 may be bent along the bending line L. According to the first embodiment of the present invention, the first bending line L1, the second bending line L2, the third bending line L3, and the fourth bending line L4 may meet each other at one point. Here, the first to fourth bending lines may be provided in a portion of the sealing part through which an electrode lead 20 protrudes. Also, the fifth bending line L5 may extend inward from the end of the fourth bending line L4.

Here, as illustrated in FIG. 4, an area defined outside the fourth bending line L4 and the fifth bending line L5 on the sealing part may be attached to the other area of the sealing part. Also, as illustrated in FIG. 4, the electrode lead 20 may protrude through the attached area.

On the other hand, as illustrated in FIG. 4, an area defined inside the fourth bending line L4 and the fifth bending line L5 on the sealing part may be spaced apart from the other area of the sealing part. An empty space may be defined between the spaced areas. That is, according to the first embodiment of the present invention as illustrated in FIG. 4, the area defined inside the fourth bending line L4 and the fifth bending line L5 on the sealing part 300 may have a space forming part 400 in which the empty space is defined.

Referring to FIGS. 2 to 4, in the case 10 manufactured according to the first embodiment of the present invention, it may be minimized that the sealing part protrudes in a width direction of an area in which the electrode assembly is provided. Particularly, referring to FIG. 4, the furthest protruding point in the width direction of the area in which the electrode assembly is provided is positioned at a point where the first to fourth bending lines L1, L2, L3, and L4 meet each other. It may be confirmed that even this point is positioned inward by I in the width direction of the area in which the electrode assembly is provided. Thus, the occurrence of the dead space not contributing to a capacity of the secondary battery may be minimized, and as a result, energy density of the secondary battery may increase.

Figure 5:
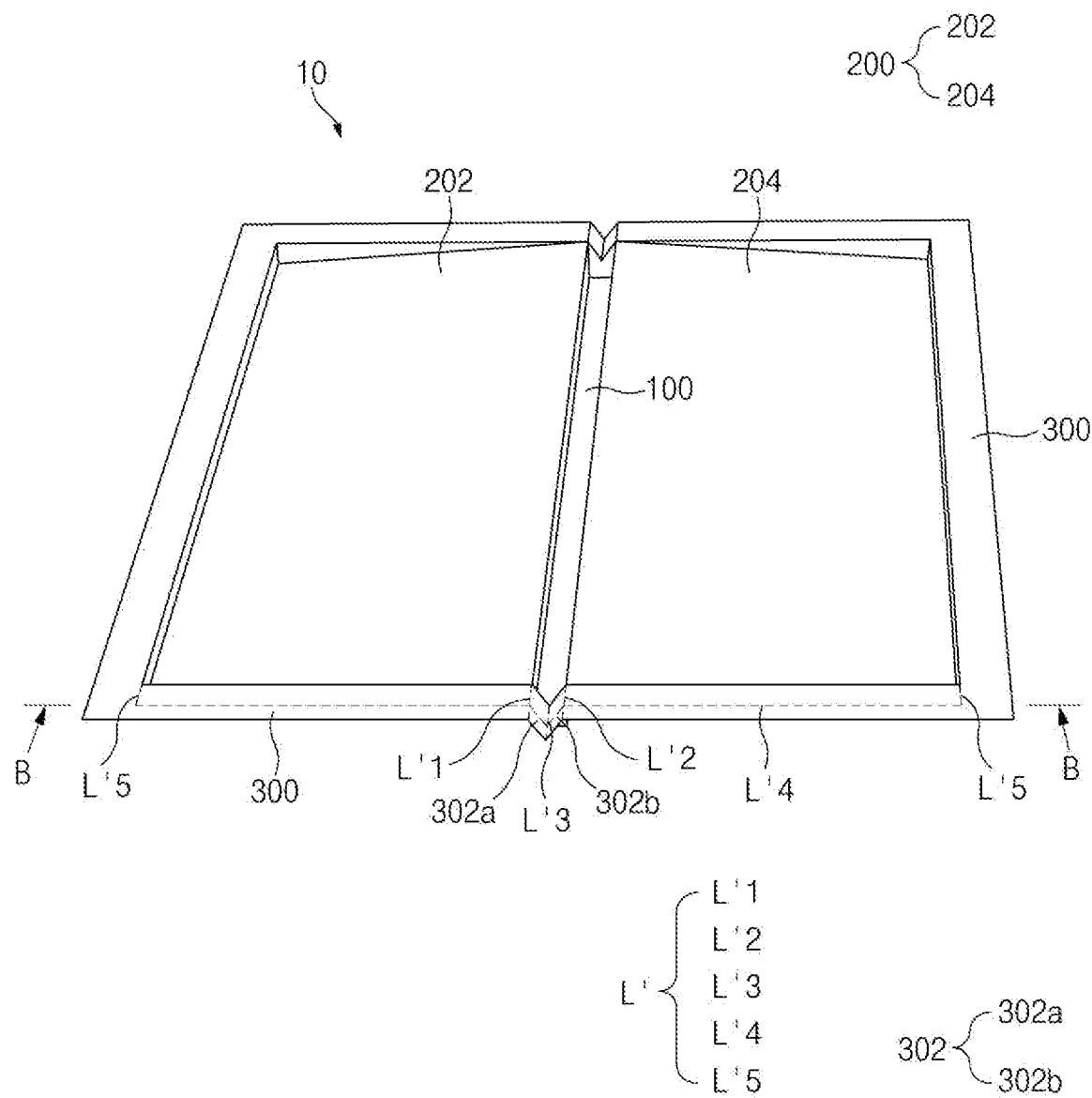
FIG. 5 is a perspective view illustrating a state in which a secondary battery case according to a second embodiment of the present invention is unfolded.
Figure 6:
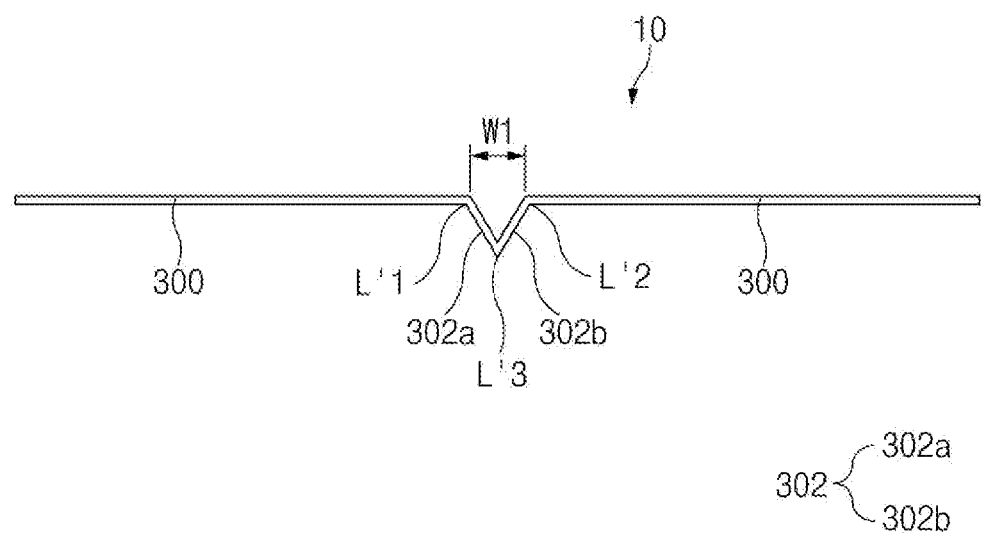
FIG. 6 is a cross-sectional view illustrating the secondary battery case, taken along line B-B of FIG. 5.

FIG. 5 is a perspective view illustrating a state in which a secondary battery case according to a second embodiment of the present invention is unfolded, and FIG. 6 is a cross-sectional view illustrating the secondary battery case, taken along line B-B of FIG. 5.

The features of the recess part, the inclined part including the first and second inclined portions, and the sealing part of the secondary battery case according to the first embodiment of the present invention may be applied as they are in the secondary battery case according to the second embodiment of the present invention. Hereinafter, a structure of the secondary battery case according to the second embodiment of the present invention will be described based on the difference from the secondary battery case according to the first embodiment of the present invention. That is, within a range not contradicting features to be described below, the features described above for the secondary battery case according to the first embodiment of the present invention may be applied as they are in the secondary battery case according to the second embodiment of the present invention.

When a secondary battery case 10 (hereinafter, referred to as a case 10) according to the second embodiment of the present invention is unfolded as illustrated in FIG. 5, a sealing recess portion 302, which is recessed in the same direction as a direction in which a recess part 100 is recessed, may be provided in a sealing part 300. Here, as illustrated in FIG. 5, the sealing recess portion 302 may be provided in an area of the sealing part 300 adjacent to the recess part 100, and the sealing recess portion 302 may be parallel to the recess part 100.

As illustrated in FIG. 6, the sealing recess portion 302 may have a predetermined width W1. Here, the width W1 of the sealing recess portion 302 may be defined as a width between points where the sealing recess portion 302 begins to be recessed downward (that is, at the uppermost ends of the sealing recess portion). Here, the width W1 of the sealing recess portion 302 may correspond to the width W (see FIG. 3) of the recess part 100. For example, the width of the sealing recess portion 302 may be equal to the width of the recess part 100.

Continuously referring to FIGS. 5 and 6, the sealing recess portion 302 of the case 10 according to the second embodiment of the present invention may include a first recess surface 302a and a second recess surface 302b. As illustrated in FIG. 5, each of the first recess surface 302a and the second recess surface 302b may be provided adjacent to the recess part 100.

Also, the first recess surface 302a and the second recess surface 302b may be inclined downward to face each other. Thus, the first recess surface 302a and the second recess surface 302b may meet each other at a lower end to form a V-shape. That is, according to the second embodiment of the present invention as illustrated in FIG. 6, a vertical cross-section of the sealing recess portion 302 may have a V-shape.

Figure 7:
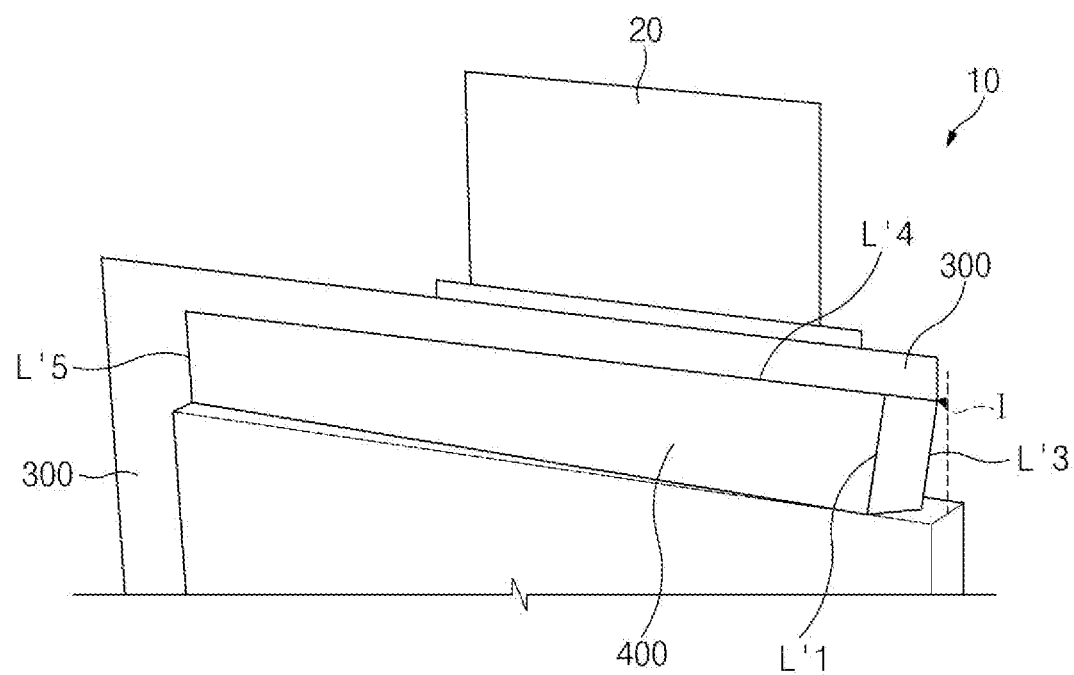
FIG. 7 is a perspective view illustrating a sealing part and a periphery of the sealing part when portions of the sealing part are attached to each other in the secondary battery case according to the second embodiment of the present invention.

FIG. 7 is a perspective view illustrating a sealing part and a periphery of the sealing part when portions of the sealing part are attached to each other in the secondary battery case according to the second embodiment of the present invention.

Like the first embodiment of the present invention, a bending line L', which is a line along which the sealing part 300 is bent, may also be provided on the sealing part 300 in the second embodiment of the present invention. That is, when portions of the sealing part 300 of the case 10 according to the second embodiment of the present invention are attached to each other as illustrated in FIGS. 5 and 7, a portion of the sealing part 300 may be bent. The bending line L' is a portion which is bent on the sealing part 300 when portions of the sealing part 300 of the case 10 according to the second embodiment of the present invention are attached to each other, and is shown as a dotted line. As illustrated in FIG. 5, the bending line L' provided on the sealing part 300 of the case 10 according to the second embodiment of the present invention may include a first bending line L'1 provided on a boundary between the first recess surface 302a and an area of the sealing part 300 adjacent to a first inclined portion 202 and a second bending line L'2 provided on a boundary between the second recess surface 302b and an area of the sealing part 300 adjacent to the second inclined portion 204. Here, in the second embodiment of the present invention, unlike the first embodiment of the present invention, the first bending line L'1 and the second bending line L'2 may be spaced apart from each other as illustrated in FIG. 5.

Continuously referring to FIG. 5, the bending line L' of the case 10 according to the second embodiment of the present invention may further include a third bending line L'3 provided on a boundary between the first recess surface 302a and the second recess surface 302b.

Also, the bending line L' may further include a fourth bending line L'4 that extends in both directions along the first inclined portion 202 and the second inclined portion 204 from one point of the third bending line L'3. FIG. 5 illustrates a state in which the fourth bending line L'4 extends along each of the first inclined portion 202 and the second inclined portion 204.

Here, according to the second embodiment of the present invention, the bending line L' may further include a fifth bending line L'5 that extends from an end of the fourth bending line L'4 toward an inclined part 200. FIG. 5 illustrates a state in which the fifth bending line L'5 extends from the end of the fourth bending line L'4 to a sharp edge on a boundary between the sealing part 300 and the inclined part 200.

According to the second embodiment of the present invention, similar to the first embodiment of the present invention, when portions of the sealing part 300 are attached to each other, the bending line L' provided on the sealing part of the case 10 is bent. FIG. 7 illustrates the sealing part and a periphery of the sealing part when portions of the sealing part 300 of the case 10 are attached to each other according to the second embodiment of the present invention.

When portions of the sealing part 300 of the case 10 according to the second embodiment of the present invention are attached to each other as illustrated in FIG. 7, the sealing part 300 may be bent along the bending line L'. According to the second embodiment of the present invention, the first bending line L'1 and the fourth bending line L'4 may meet each other at one point, the second bending line L'2 (not shown in FIG. 7) and the fourth bending line L'4 may meet each other at one point, and the third bending line L'3 and the fourth bending line L'4 may also meet each other at one point.

Here, second embodiment of the present invention, similar to the first embodiment of the present invention, the first to fourth bending lines may be provided in a portion of the sealing part through which an electrode lead 20 protrudes. Also, the fifth bending line L'5 may extend inward from the end of the fourth bending line L'4.

Here, as illustrated in FIG. 7, an area defined outside the fourth bending line L'4 and the fifth bending line L'5 on the sealing part may be attached to the other area of the sealing part. Also, as illustrated in FIG. 7, the electrode lead 20 may protrude through the attached area.

On the other hand, as illustrated in FIG. 7, an area defined inside the fourth bending line L'4 and the fifth bending line L'5 on the sealing part may be spaced apart from the other area of the sealing part. An empty space may be defined between the spaced areas. That is, according to the second embodiment of the present invention as illustrated in FIG. 7, the area defined inside the fourth bending line L'4 and the fifth bending line L'5 on the sealing part 300 may have a space forming part 400 in which the empty space is defined.

Referring to FIGS. 5 to 7, in the case 10 manufactured according to the second embodiment of the present invention, it may also be minimized that the sealing part protrudes in a width direction of an area in which the electrode assembly is provided. Particularly, referring to FIG. 7, the furthest protruding point in the width direction of the area in which the electrode assembly is provided is positioned at a point where the third bending line L'3 and the fourth bending line L'4 meet each other. It may be confirmed that even this point is positioned inward by I in the width direction of the area in which the electrode assembly is provided. Thus, in the second embodiment of the present invention, the occurrence of the dead space not contributing to a capacity of the secondary battery may also be minimized, and as a result, energy density of the secondary battery may increase.

Figure 8:
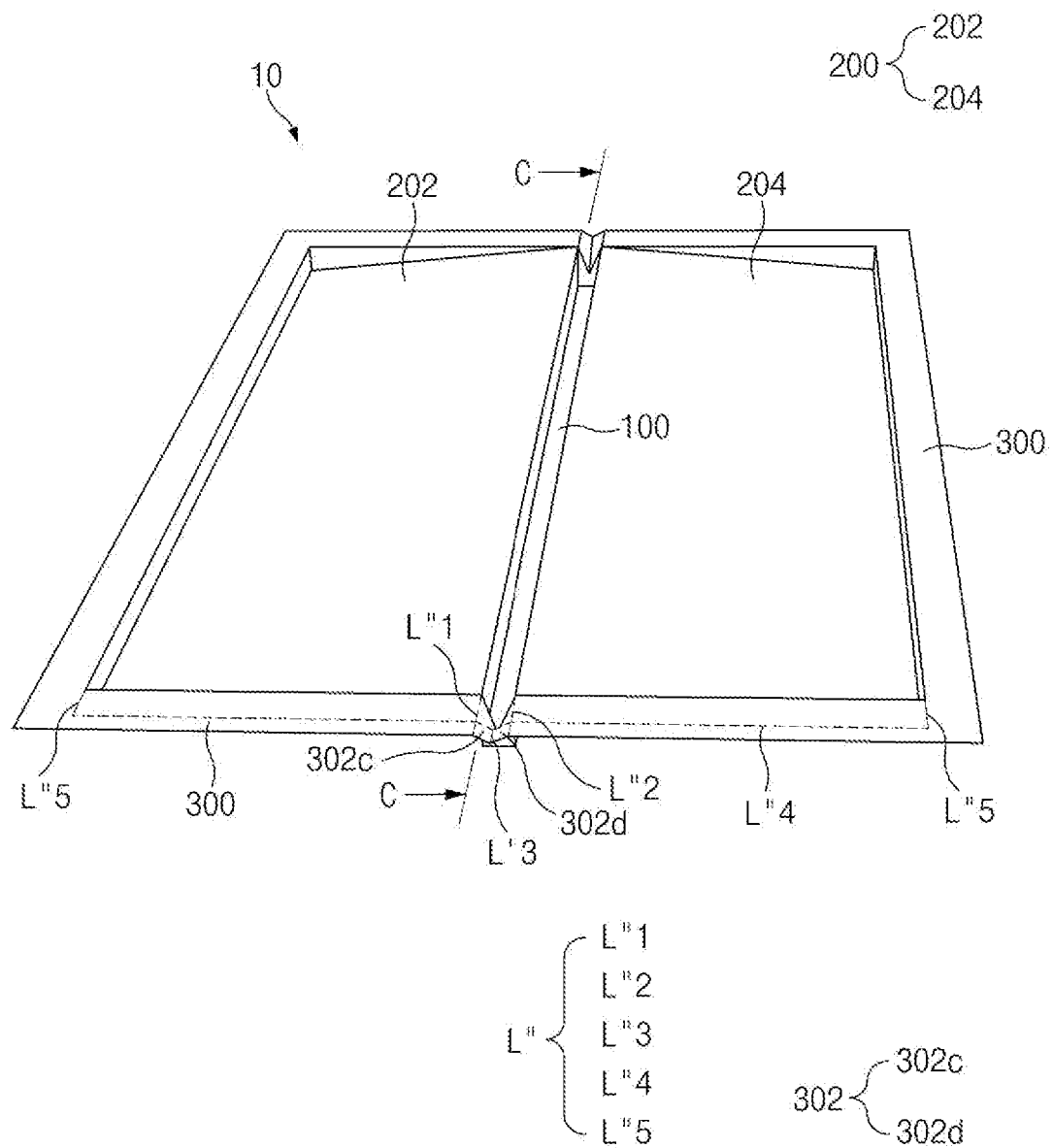
FIG. 8 is a perspective view illustrating a state in which a secondary battery case according to a third embodiment of the present invention is unfolded.
Figure 9:
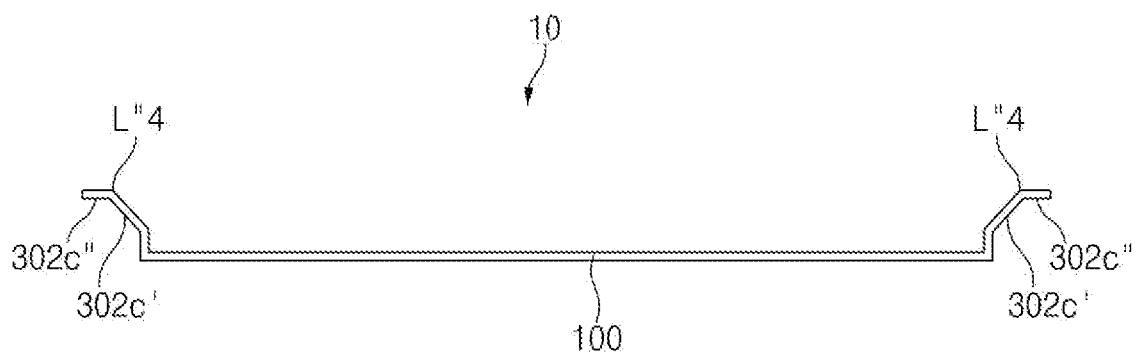
FIG. 9 is a cross-sectional view illustrating the secondary battery case, taken along line C-C of FIG. 8.

FIG. 8 is a perspective view illustrating a state in which a secondary battery case according to a third embodiment of the present invention is unfolded, and FIG. 9 is a cross-sectional view illustrating the secondary battery case, taken along line C-C of FIG. 8.

The features of the recess part, the inclined part including the first and second inclined portions, and the sealing part of the secondary battery case according to the first embodiment of the present invention may be applied as they are in the secondary battery case according to the third embodiment of the present invention. Hereinafter, a structure of the secondary battery case according to the third embodiment of the present invention will be described based on the difference from the secondary battery case according to the first embodiment of the present invention. That is, within a range not contradicting features to be described below, the features described above for the secondary battery case according to the first embodiment of the present invention may be applied as they are in the secondary battery case according to the third embodiment of the present invention.

When a secondary battery case 10 (hereinafter, referred to as a case 10) according to the third embodiment of the present invention is unfolded as illustrated in FIG. 8, a sealing recess portion 302, which is recessed in the same direction as a direction in which a recess part 100 is recessed, may be provided in a sealing part 300. Here, as illustrated in FIG. 8, the sealing recess portion 302 may be provided in an area of the sealing part 300 adjacent to the recess part 100, and the sealing recess portion 302 may be parallel to the recess part 100.

Continuously referring to FIGS. 8 and 9, the sealing recess portion 302 of the case 10 according to the third embodiment of the present invention may include a third recess surface 302c and a fourth recess surface 302d. As illustrated in FIG. 8, each of the third recess surface 302c and the fourth recess surface 302d may be provided adjacent to the recess part 100.

Also, in the third embodiment of the present invention, similar to the second embodiment of the present invention, the third recess surface 302c and the fourth recess surface 302d may be inclined downward to face each other. Thus, the third recess surface 302c and the fourth recess surface 302d may meet each other at a lower end to form a V-shape. That is, similar to the second embodiment of the present invention, a vertical cross-section of the sealing recess portion 302 according to the third embodiment of the present invention may have a V-shape.

However, in the third embodiment of the present invention, unlike the second embodiment of the t present invention, when the case is unfolded and taken along line C-C of FIG. 8, the sealing recess portion 302 may be divided into an inclined area and a flat area. That is, according to the third embodiment of the present invention as illustrated in FIGS. 8 and 9, the third recess surface 302c of the sealing s portion 302 may include a first inclined recess surface 302c' which is inclined downward from the recess part 100 toward the fourth recess surface 302d and is inclined upward toward the outside of the sealing part 300. The third recess surface 302c may further include a second inclined recess surface 302c" which is inclined downward toward the fourth recess surface 302d and horizontally extends from the first inclined recess surface 302c' toward the outside of the sealing part 300. Also, according to the third embodiment of the present invention, the fourth recess surface 302d of the sealing recess portion 302 may include a third inclined recess surface which is inclined downward from the recess part 100 toward the third recess surface 302c and is inclined upward toward the outside of the sealing part 300. The fourth recess surface 302d may further include a fourth inclined recess surface which is inclined downward toward the third recess surface 302c and horizontally extends from the third inclined recess surface toward the outside of the sealing part 300.

Figure 10:
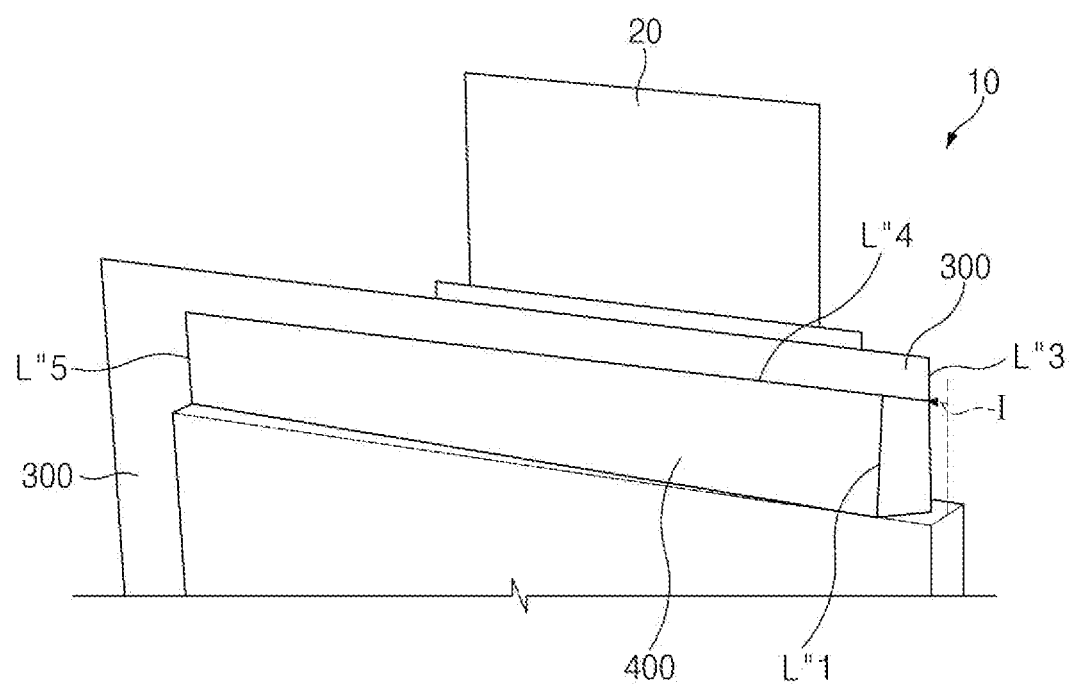
FIG. 10 is a perspective view illustrating a sealing part and a periphery of the sealing part when portions of the sealing part are attached to each other in the secondary battery case according to the third embodiment of the present invention.

FIG. 10 is a perspective view illustrating a sealing part and a periphery of the sealing part when portions of the sealing part are attached to each other in the secondary battery case according to the third embodiment of the present invention.

Like the first embodiment of the present invention, a bending line L", which is a line along which the sealing part 300 is bent, may also be provided on the sealing part 300 in the third embodiment of the present invention. That is, when portions of the sealing part 300 of the case 10 according to the third embodiment of the present invention are attached to each other as illustrated in FIGS. 8 and 10, a portion of the sealing part 300 may be bent. The bending line L" is a portion which is bent on the sealing part 300 when portions of the sealing part 300 of the case 10 according to the third embodiment of the present invention are attached to each other, and is shown as a dotted line.

As illustrated in FIG. 8, the bending line L" provided on the sealing part 300 of the case 10 according to the third embodiment of the present invention may include a first bending line L"1 provided on a boundary between the third recess surface 302c and an area of the sealing part 300 adjacent to a first inclined portion 202 and a second bending line L"2 provided on a boundary between the fourth recess surface 302d and an area of the sealing part 300 adjacent to the second inclined portion 204. Here, in the third embodiment of the present invention, similar to the second embodiment of the present invention, the first bending line L"1 and the second bending line L"2 may also be spaced apart from each other as illustrated in FIG. 8.

Continuously referring to FIG. 8, the bending line L" of the case 10 according to the third embodiment of the present invention may further include a third bending line L"3 provided on a boundary between the third recess surface 302c and the fourth recess surface 302d.

Also, the bending line L" may further include a fourth bending line L"4 that extends in both directions along the first inclined portion 202 and the second inclined portion 204 from one point of the third bending line L"3. FIG. 8 illustrates a state in which the fourth bending line L"4 extends along each of the first inclined portion 202 and the second inclined portion 204.

Here, according to the third embodiment of the present invention, the bending line L" may further include a fifth bending line L"5 that extends from an end of the fourth bending line L"4 toward an inclined part 200. FIG. 8 illustrates a state in which the fifth bending line L"5 extends from the end of the fourth bending line L"4 to a sharp edge on a boundary between the sealing part 300 and the inclined part 200.

According to the third embodiment of the present invention, similar to the first embodiment of the present invention, when portions of the sealing part 300 are attached to each other, the bending line L" provided on the sealing part of the case 10 is bent. FIG. 10 illustrates the sealing part and a periphery of the sealing part when portions of the sealing part 300 of the case 10 are attached to each other according to the third embodiment of the present invention.

When portions of the sealing part 300 of the case 10 according to the third embodiment of the present invention are attached to each other as illustrated in FIG. 10, the sealing part 300 may be bent along the bending line L". According to the third embodiment of the present invention, the first bending line L"1 and the fourth bending line L"4 may meet each other at one point, the second bending line L"2 (not shown in FIG. 10) and the fourth bending line L"4 may meet each other at one point, and the third bending line L"3 and the fourth bending line L"4 may also meet each other at one point.

Here, in the third embodiment of the present invention, similar to the first embodiment of the present invention, the first to fourth bending lines may be provided in a portion of the sealing part through which an electrode lead 20 protrudes. Also, the fifth bending line L"5 may extend inward from the end of the fourth bending line L"4.

Here, as illustrated in FIG. 10, an area defined outside the fourth bending line L"4 and the fifth bending line L"5 on the sealing part may be attached to the other area of the sealing part. Also, as illustrated in FIG. 10, the electrode lead 20 may protrude through the attached area.

On the other hand, as illustrated in FIG. 10, an area defined inside the fourth bending line L"4 and the fifth bending line L"5 on the sealing part may be spaced apart from the other area of the sealing part. An empty space may be defined between the spaced areas. That is, according to the third embodiment of the present invention as illustrated in FIG. 10, the area defined inside the fourth bending line L"4 and the fifth bending line L"5 on the sealing part 300 may have a space forming part 400 in which the empty space is defined.

Referring to FIGS. 8 to 10, in the case 10 manufactured according to the third embodiment of the present invention, it may also be minimized that the sealing part protrudes in a width direction of an area in which the electrode assembly is provided. Particularly, referring to FIG. 10, the furthest protruding point in the width direction of the area in which the electrode assembly is provided is positioned at a point where the third bending line L"3 and the fourth bending line L"4 meet each other. It may be confirmed that even this point is positioned inward by I in the width direction of the area in which the electrode assembly is provided. Thus, in the third embodiment of the present invention, the occurrence of the dead space not contributing to a capacity of the secondary battery may also be minimized, and as a result, energy density of the secondary battery may increase.

Figure 11:
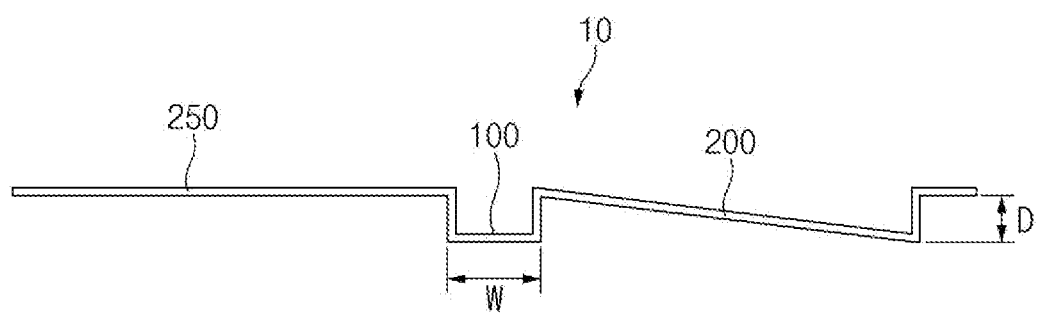
FIG. 11 is a cross-sectional view illustrating a first modified example of a secondary battery case according to the present invention.

FIG. 11 is a cross-sectional view illustrating a first modified example of a secondary battery case according to the present invention.

In a secondary battery case 10 according to the present invention, an inclined part 200 may be provided only on one side of a recess part 100. That is, in the first modified example of the secondary battery case according to the present invention, when the secondary battery case 10 is unfolded, the inclined part 200 may be provided on one side of the recess part 100, and a flat part 250 having a flat surface may be defined on the other side of the recess part 100. In this case, a height D of a stepped portion between the inclined part 200 and the sealing part 300 may correspond to a width W of the recess part 100. For example, D and W may be equal to each other.

Figure 12:
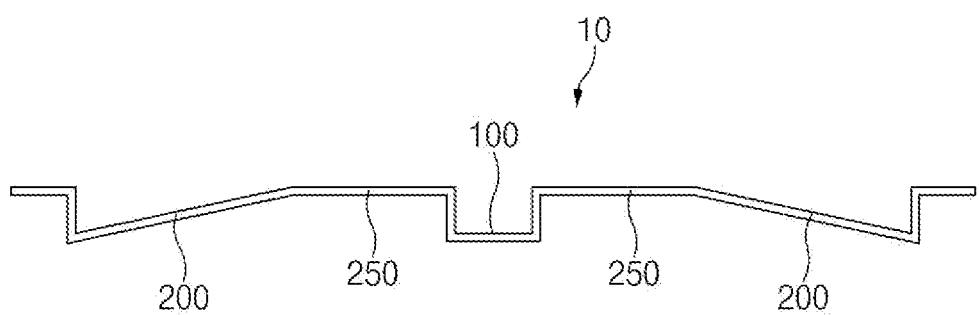
FIG. 12 is a cross-sectional view illustrating a second modified example of a secondary battery case according to the present invention.

FIG. 12 is a cross-sectional view illustrating a second modified example of a secondary battery case according to the present invention.

In the second modified example of the secondary battery case according to the present invention, when a secondary battery case 10 is unfolded, both an inclined area and a flat area may be defined together in each of both sides of a recess part 100. That is, in the secondary battery case 10 according to the second modified example of the present invention as illustrated in FIG. 12, both an inclined part 200 and a flat part 250, which is provided between the inclined part 200 and the recess part 100 and has a flat surface, may be provided in each of both sides of the recess part 100.

Also, a secondary battery according to the present invention may include an electrode assembly and a secondary battery case for accommodating the electrode assembly. A description for the secondary battery case will be omitted because it is given earlier.

Although the present invention is described by specific embodiments and drawings as described above, the present invention is not limited thereto, and it is obvious that various changes and modifications may be made by a person skilled in the art to which the present invention pertains within the technical idea of the present invention and equivalent scope of the appended claims.

The invention claimed is:

1. A secondary battery case configured to accommodate an electrode assembly having a structure in which electrodes and separators are alternately arranged, the secondary battery case comprising:
   a recess part recessed downward; and
   a sealing part provided around the recess part when the secondary battery case is unfolded, and
   an inclined part adjacent to the recess part and has a surface that is inclined downward toward the outside in a direction away from the recess part when the secondary battery case is unfolded,
   wherein at least portions of the sealing part are attached to each other to seal inner surfaces of the recess part from an outside, and
   wherein, when the secondary battery case is unfolded, the sealing part surrounds circumferences of the recess part and the inclined part.

2. The secondary battery case of claim 1, wherein the inclined part comprises:
   a first inclined portion provided on one side of the recess part when the secondary battery case is unfolded; and
   a second inclined portion provided on another side of the recess part when the secondary battery case is unfolded.

3. The secondary battery case of claim 2, wherein, when the secondary battery case is unfolded, a sum of a height of a stepped portion between the first inclined portion and the sealing part and a height of a stepped portion between the second inclined portion and the sealing part corresponds to a width of the recess part.

4. The secondary battery case of claim 2, wherein a bending line, which is a line along which the sealing part is bent, is disposed on the sealing part, and
   the bending line comprises:
   a first bending line extending outward from a point at which the first inclined portion, the recess part, and the sealing part meet each other;
   a second bending line extending outward from a point at which the second inclined portion, the recess part, and the sealing part meet each other, the second bending line meeting the first bending line; and
   a third bending line extending outward from a point at which the first bending line and the second bending line meet each other.

5. The secondary battery case of claim 4, wherein the bending line further comprises a fourth bending line that extends along the first inclined portion and the second inclined portion from a point at which the first bending line, the second bending line, and the third bending line meet each other.

6. The secondary battery case of claim 5, wherein an area of the sealing part defined outside the fourth bending line is attached to another area of the sealing part.

7. The secondary battery case of claim 2, wherein, when the secondary battery case is unfolded, a sealing recess portion, which is recessed in a direction in which the recess part is recessed, is provided on the sealing part,
   the sealing recess portion is provided in parallel to the recess part, and
   a width of the sealing recess portion corresponds to a width of the recess part.

8. The secondary battery case of claim 7, wherein the sealing recess portion comprises a first recess surface and a second recess surface which are provided adjacent to the recess part, and
   the first recess surface and the second recess surface meet each other to form a V-shape,
   wherein a bending line, which is a line along which the sealing part is bent, is provided on the sealing part, and
   the bending line comprises:
   a first bending line provided on a boundary between the first recess surface and an area of the sealing part, which is adjacent to the first inclined portion;
   a second bending line provided on a boundary between the second recess surface and an area of the sealing part, which is adjacent to the second inclined portion; and
   a third bending line provided on a boundary between the first recess surface and the second recess surface.

9. The secondary battery case of claim 8, wherein the bending line further comprises a fourth bending line that extends in both directions along the first inclined portion and the second inclined portion from one point of the third bending line.

10. The secondary battery case of claim 9, wherein an area of the sealing part defined outside the fourth bending line is attached to another area of the sealing part.

11. The secondary battery case of claim 7, wherein the sealing recess portion comprises a first recess surface and a second recess surface which are provided adjacent to the recess part, and
    the first recess surface and the second recess surface meet each other to form a V-shape,
    wherein the first recess surface comprises:
    a first inclined recess surface which is inclined downward from the recess part toward the second recess surface and is inclined upward toward an outside of the sealing part; and
    a second inclined recess surface which extends outward from the first inclined recess surface,
    wherein the second recess surface comprises:
    a third inclined recess surface which is inclined downward from the recess part toward the first recess surface and is inclined upward toward the outside of the sealing part; and
    a fourth inclined recess surface which extends outward from the third inclined recess surface.

12. The secondary battery case of claim 11, wherein a bending line, which is a line along which the sealing part is bent, is provided on the sealing part, and
    the bending line comprises:
    a first bending line provided on a boundary between the first recess surface and an area of the sealing part adjacent to the first inclined portion;
    a second bending line provided on a boundary between the second recess surface and an area of the sealing part adjacent to the second inclined portion; and
    a third bending line provided on a boundary between the first recess surface and the second recess surface.

13. The secondary battery case of claim 12, wherein the bending line further comprises a fourth bending line that extends along the first inclined portion and the second inclined portion from one point of the third bending line.

14. The secondary battery case of claim 13, wherein an area of the sealing part defined outside the fourth bending line is attached to another area of the sealing part.

15. The secondary battery case of claim 1, wherein, the inclined part is provided on one side of the recess part when the secondary battery case is unfolded, and
    the secondary battery case further comprises a flat part which has a flat surface and is provided on another side of the recess part when the secondary battery case is unfolded.

16. The secondary battery case of claim 1, further comprising a flat part which has a flat surface and is provided between the inclined part and the recess part when the secondary battery case is unfolded.

17. A secondary battery comprising:
   the electrode assembly; and
   the secondary battery case of claim 1.

18. The secondary battery of claim 17, wherein the recess part of the secondary battery case has a width that corresponds to a thickness of the electrode assembly.

19. The secondary battery case of claim 1, wherein the inclined part is configured to accommodate the electrode assembly.

\* \* \* \* \*